(12) United States Patent
Polehn et al.

(10) Patent No.: US 11,689,345 B2
(45) Date of Patent: Jun. 27, 2023

(54) SYSTEMS AND METHODS FOR OBTAINING DATA OF A DEVICE VIA A BACKSCATTER SIGNAL

(71) Applicant: Verizon Patent and Licensing Inc., Basking Ridge, NJ (US)

(72) Inventors: Donna L. Polehn, Mercer Island, WA (US); Corey J. Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/453,951

(22) Filed: Nov. 8, 2021

(65) Prior Publication Data
US 2023/0142550 A1 May 11, 2023

(51) Int. Cl.
*H04L 41/08* (2022.01)
*H04L 5/14* (2006.01)

(52) U.S. Cl.
CPC .................. *H04L 5/1438* (2013.01)

(58) Field of Classification Search
CPC .......................... H04L 41/0833; H04L 5/1438
See application file for complete search history.

(56) References Cited

U.S. PATENT DOCUMENTS

2016/0365890 A1* 12/2016 Reynolds ............ H04L 27/2602
2020/0212956 A1* 7/2020 Gollakota .............. H04B 1/713

OTHER PUBLICATIONS

Liu et al., "Next generation backscatter communication: systems, techniques, and applications," EURASIP Journal on Wireless Communications and Networking, Article 69, 2019, https://doi.org/10.1186/s13638-019-1391-7, 11 pages.

Hoang, "Ultra low-voltage low power backscatter communication and energy harvesting for long-range battery-free sensor tags," A dissertation submitted in partial fulfillment of the requirements for the degree of Doctor of Philosophy University of Washington 2019, 108 pages.

Fara et al., Reconfigurable Intelligent Surface-Assisted Ambient Backscatter Communications—Experimental Assessment, Accepted to IEEE International Conference on Communications Workshop on Reconfigurable Intelligent Surfaces for Future Wireless Communications, 2021, Paris-Saclay University, CNRS, CentraleSupélec, Laboratory of Signals and Systems, 7 pages.

Kellogg et al., "Wi-Fi Backscatter: Internet Connectivity for RF-Powered Devices," SIGCOMM '14: Proceedings of the 2014 ACM conference on SIGCOMM, Aug. 2014, Chicago, IL, https://dl.acm.org/doi/10.1145/2619239.2626319, 12 pages.

(Continued)

*Primary Examiner* — Shukri Taha

(57) ABSTRACT

In some implementations, a base station may provide a first continuous wave signal during a first period of time. The base station may receive, from a first device, a first response signal based on providing the first continuous wave signal. The base station may provide, to the first device, a second continuous wave signal during a second period of time subsequent to the first period of time, wherein the second continuous wave signal is provided based on receiving the first response. The base station may receive, from the first device, a second response signal based on providing the second continuous wave, wherein the second response signal includes device data obtained by the first device.

20 Claims, 10 Drawing Sheets

(56) References Cited

OTHER PUBLICATIONS

Fadelli et al., "Researchers realize a printed millimetrewave modulator and antenna array for backscatter communications," TechXplore, Jul. 2021, https://techxplore.com/news/2021-07-millimetre-wave-modulator-antenna-array-backscatter.html, 2 pages.

"5G/NR—Frame Structure," https://www.sharetechnote.com/html/5G/5G_FrameStructure.html, downloaded Oct. 8, 2021, 21 pages.

* cited by examiner

SYSTEMS AND METHODS FOR OBTAINING DATA OF A DEVICE VIA A BACKSCATTER SIGNAL

BACKGROUND

Fifth Generation New Radio (5G/NR) provides various enhancements to wireless communications, such as flexible bandwidth allocation, improved spectral efficiency, ultra-reliable low-latency communications (URLLC), beamforming, high-frequency (e.g., millimeter wave (mmWave)) communication, and/or other enhancements.

DETAILED DESCRIPTION OF PREFERRED EMBODIMENTS

Figure 1A:
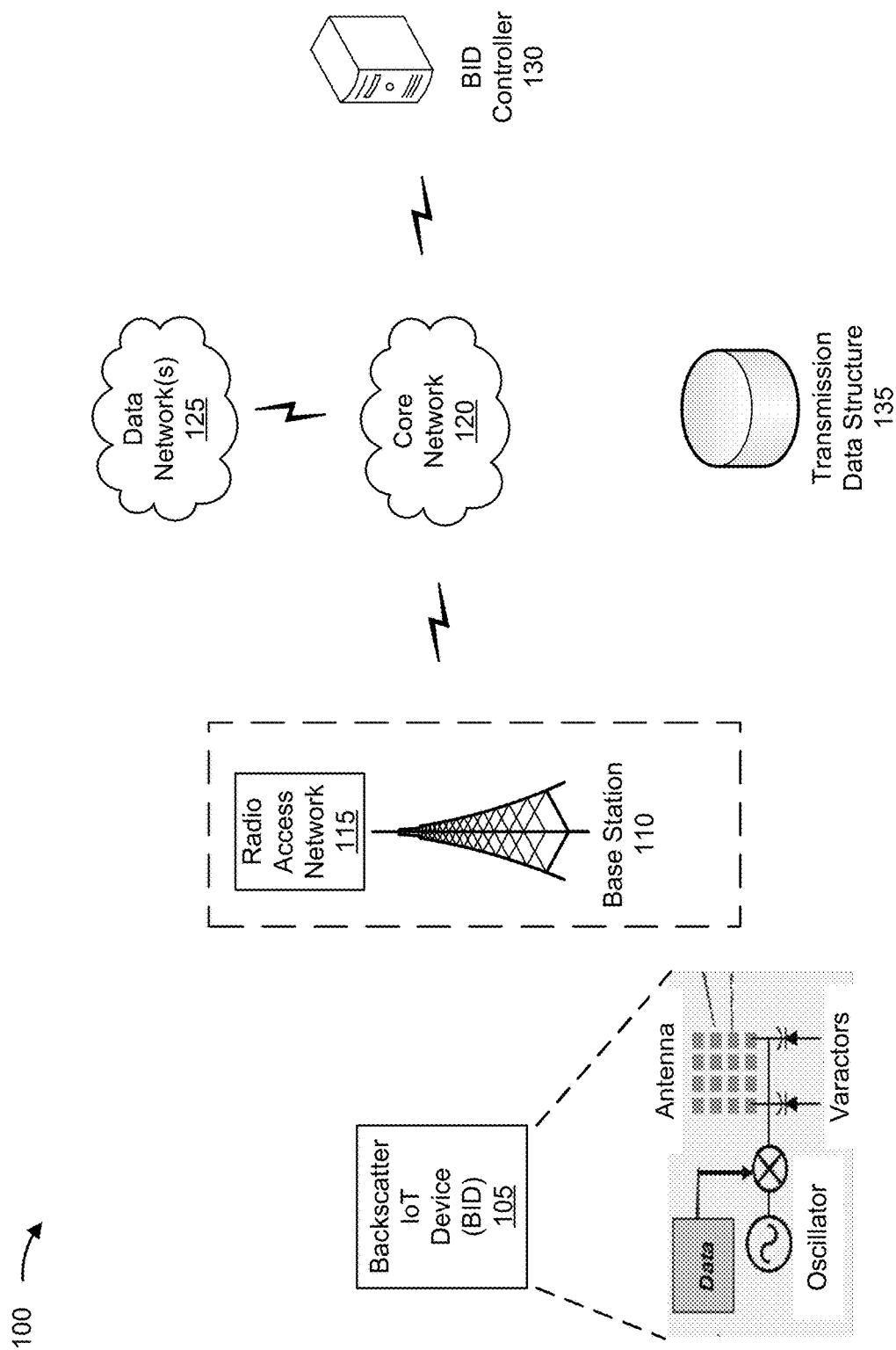
FIGS. 1A-1F are diagrams of an example associated with obtaining data of a device via a backscatter signal.

The following detailed description of example implementations refers to the accompanying drawings. The same reference numbers in different drawings may identify the same or similar elements.

The Internet of Things (IoT) may refer to a network of physical objects or "things" embedded with electronics, software, sensors, and/or network connectivity, which enables these objects to collect and exchange data. As an example, an IoT device (e.g., 5G mmWave IoT device) may be used to obtain and provide different types of data. In some situations, the IoT device may exchange a substantial amount of data with an application server.

Typically, the IoT device utilizes a transmitter for transmitting signals. Transmitting requires a considerable amount of power. Accordingly, transmitting may waste energy resources (e.g., battery resources and/or power grid resources), limit an IoT devices lifespan, waste computing resources, networking resources, among other examples. Additionally, the transmitter and associated power source may significantly increase the cost of the IoT device.

Implementations described herein are directed to using backscatter signals to transmit data obtained by a device (e.g., without using a dedicated transmitter as described above). For example, a base station may provide a continuous wave (CW) signal during a downlink transmission associated with time division duplexing (TDD). The base station may allocate a bandwidth part for the purpose of communicating with the device and may provide the CW signal using the bandwidth part. For example, the base station may provide the CW signal using physical resource blocks (PRBs) associated with the bandwidth part.

The device may receive a CW signal and provide a response signal that is a signal reflected from the CW signal provided by the base station. For example, the device may provide the response signal as a backscatter signal. In some examples, the device may generate a modulated CW signal by modulating the CW signal with information, such as device identification information identifying the IoT device and/or device data obtained by the device. For example, the device may encode the information on the CW signal. The response signal may include the modulated CW signal. The base station may demodulate the response signal to obtain the device identification information and/or the device data. The base station may cause the device data to be provided (e.g., to a cloud computing environment) for processing.

By providing the device identification information and/or the device data using the backscatter signal as described herein, the device may no longer require the use of a transmitter, as described above. Accordingly, the device may preserve energy resources (e.g., battery resources and/or power grid resources), computing resources, networking resources, among other examples that would have otherwise been used by the transmitter to provide the device identification information and/or the device data. Preserving energy resources, in this manner, may be beneficial in situations in which the device cannot be powered directly or cannot be accessed to be repaired or replaced (e.g., in situations in which the device is embedded in a structure, such as a building or a bridge).

FIGS. 1A-1F are diagrams of an example 100 associated with obtaining data of a device via a backscatter signal. As shown in FIG. 1A, example 100 includes a backscatter IoT device (BID) 105, a base station 110, a radio access network (RAN) 115, a core network 120, and one or more data networks 125 (referred to individually as "data network 125" and collectively as "data networks 125"), a BID controller 130, and a transmission data structure 135.

Example 100 illustrates various portions of a wireless telecommunications system (referred to herein as a "wireless network"). The wireless network may be a 5G wireless telecommunications system, a 4G wireless telecommunications system, a Long-Term Evolution (LTE) wireless telecommunications system, or an LTE-Advanced (LTE-A) wireless telecommunications system.

BID 105 may include one or more devices capable of receiving, generating, storing, processing, and/or providing information (e.g., providing information without a transmitter), as described elsewhere herein. For example, BID 105 may obtain device data (e.g., by measuring, sensing, collecting, among other examples) and provide the device data and/or device identification information identifying BID 105. In some examples, BID 105 may be an IoT device.

In some implementations, BID 105 may include one or more components configured to reflect signals received by BID 105. For example, BID 105 may include an antenna (e.g., a flat panel antenna) that is configured to reflect signals provided by base station 110. For instance, the antenna may reflect energy from the signals. Accordingly, BID 105 may provide response signals (to the signals provided by base station 110) as backscatter signals.

In some implementations, the antenna may be connected to one or more components configured to shift (or change) an amplitude and/or a phase of the signals provided by base station 110. For example, the antenna may be connected to one or more varactor diodes (hereinafter "varactors") that may be configured to shift the amplitude and/or the phase of the signals. Alternatively, the antenna may be connected to a metal-oxide-semiconductor field-effect transistor (MOSFET), a pseudomorphic high-electron-mobility transistor (pHEMT), or another similar electronic component (e.g., an electronic component that is electrically controlled to provide reactants or, in other words, an electronic component that can vary a reactance electronically). The antenna may further be connected to an oscillator, such as a Colpitts oscillator, a DRO (Dielectric Resonator Oscillators), and/or other mm-wave signal generating component.

The amplitude and/or the phase of the signals may be shifted based on the device data and/or the device identification information. In this regard, by shifting the amplitude and/or the phase, BID 105 may modulate the signals to include (or encode) the device data and/or the device identification information. BID 105 may modulate the signals based on a modulation encoding scheme provided by base station 110 and/or by BID controller 130. In some implementations, BID 105 may be pre-configured with the modulation encoding scheme.

Base station 110 may be connected to data network 125 via core network 120. Base station 110 may be configured to provide the signals (e.g., CW signals) during a downlink transmission associated with TDD. Base station 110 may provide the signals using PRBs associated with communicating with low-power devices, such as BID 105. In some examples, base station 110 may periodically schedule a PRB to perform a scan (for BIDs) using a CW wave signal (during a TDD cycle associated with a downlink transmission). For instance, base station 110 may transmit, on the PRB during the TDD cycle, the CW signal along with beam synchronizing signals (that are transmitted during a normal operation of base station 110). The CW signal may cause BID 105 to transmit a response signal (responsive to the CW signal) and base station 110 may monitor receipt of the response signal. Base station 110, RAN 115, core network 120, and data networks 125 are described in more detail below in connection with FIGS. 2 and 3.

BID controller 130 (e.g., a BID controller device) may include one or more devices capable of receiving, generating, storing, processing, and/or providing information, as described elsewhere herein. For example, BID controller 130 may be configured to provide instructions that may cause BID 105 to provide the device data and/or the device identification information to base station 110. In some examples, BID controller 130 may be configured to receive the device data and provide the device data to one or more devices for processing.

Transmission data structure 135 may include a data structure (e.g., a database, a table, and/or a linked list) that stores beam information regarding different beams of base station 110 in association with information identifying devices to which signals (generated the different beams) are provided, as described herein. In some implementations, base station 110 may use information stored in transmission data structure 135 to communicate with BID 105, as described herein.

In the example that follows, an owner of BID 105 may desire that base station 110 discovers BID 105 to enable BID 105 to provide the device data (and/or the device identification information) to BID controller 130 via base station 110. BID 105 may include a low-power IoT device. BID 105 may be powered using a battery, solar cells, and/or another energy source, among other examples. The type of device of BID 105 and the type of device data provided by BID 105 are merely provided as an example. In practice, a different type of BID 105 and/or a different type of device may be used in different situations.

Figure 1B:
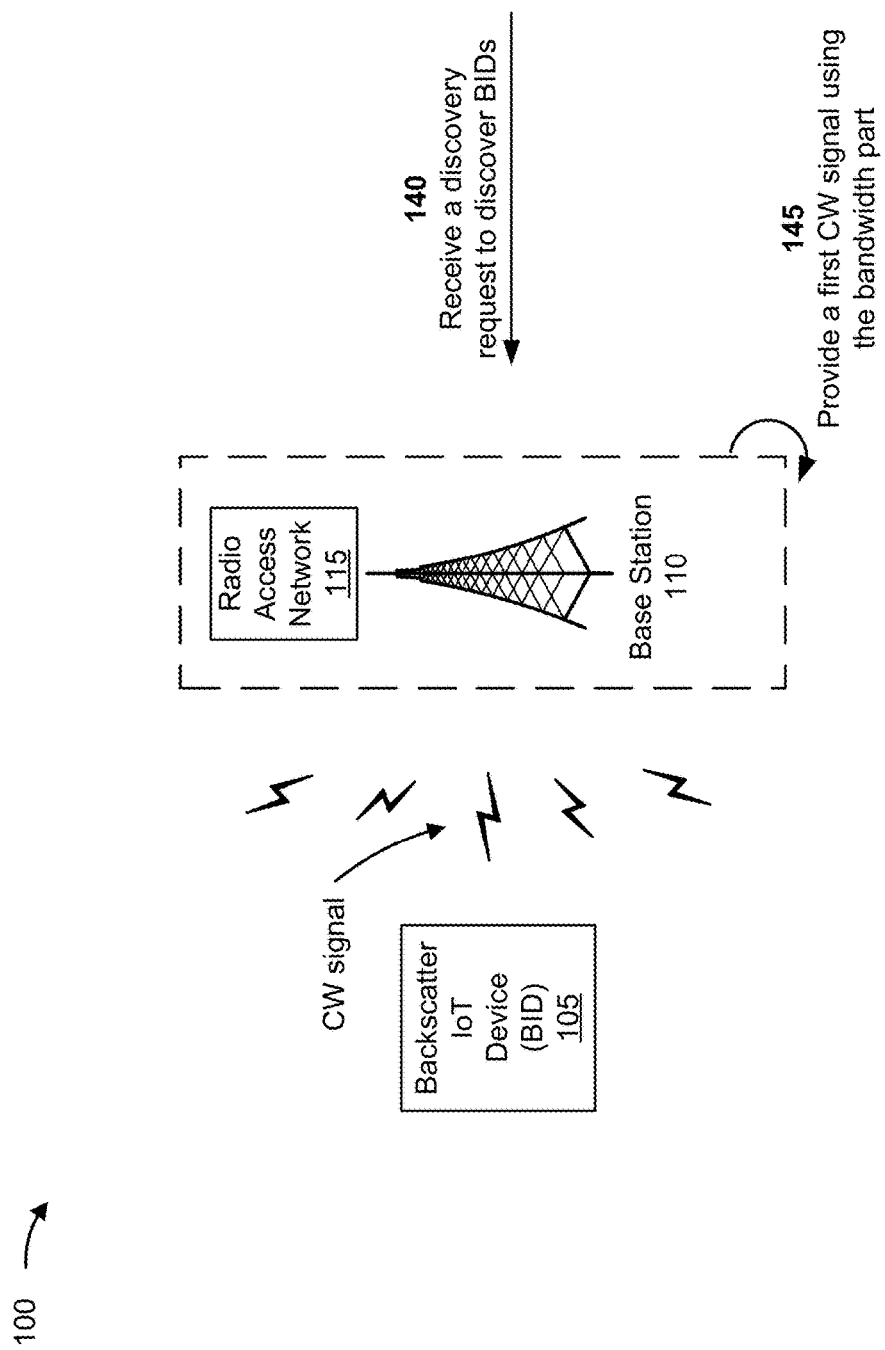

As shown in FIG. 1B, and by reference number 140, base station 110 may receive a discovery request to discover BIDs. For example, base station 110 may receive the discovery request from BID controller 130. In some situations, the owner of BID 105 may use a user device to transmit an instruction to cause BID controller 130 to provide the discovery request to base station 110. The user device may include a wireless communication device, a radiotelephone, a smart phone, a laptop computer, a tablet computer, a personal gaming system, user equipment, and/or a similar device.

The discovery request may include an instruction to cause base station 110 to engage in a discovery process to identify BID 105 and/or other devices similar to BID 105. In some implementations, based on receiving the discovery request, base station 110 may allocate (or assign) a bandwidth part for communicating with BID 105. In some implementations, the bandwidth part may define a channel bandwidth and a modulation encoding scheme that will be conducive to a low-power device. The channel bandwidth and the modulation encoding scheme may be defined to enable communication with low-power devices, such as BID 105. The bandwidth part may be associated with one or more PRBs.

As shown in FIG. 1B, and by reference number 145, base station 110 may provide a first CW signal using the bandwidth part. For example, base station 110 may provide the first CW signal (e.g., a backscatter CW signal) to discover BID 105 and/or one or more other devices similar to BID 105. The first CW signal may include a mmWave signal (e.g., a signal transmitted in a range of 30-300 GHz, for example at about 28 GHz). In some implementations, base station 110 may provide the first CW signal based on receiving the discovery request. Additionally, or alternatively, base station 110 may be configured to provide the first CW signal periodically (e.g., every minute, every hour, every twelve hours, every twenty-four hours, among other examples).

In some implementations, base station 110 may provide the first CW signal using a beam of a plurality of beams of base station 110. For example, base station 110 may provide the first CW signal using the beam and may provide one or more modulated signals using one or more other beams of the plurality of beams. The beam and/or the one or more other beams may include scanning beams.

In some implementations, base station 110 may store beam information regarding the plurality of beams in transmission data structure 135. As an example, the beam information regarding the beam may include information regarding an antenna associated with the beam, information identifying the beam, and information identifying a beam direction of the beam. The information identifying the beam direction may include information regarding an azimuth angle associated with the beam and/or information regarding an elevation associated with the beam.

Base station 110 may schedule transmission of the first CW signal during a downlink transmission associated with TDD. In this regard, base station 110 may provide the first CW signal during a period of time associated with the downlink transmission.

Figure 1C:
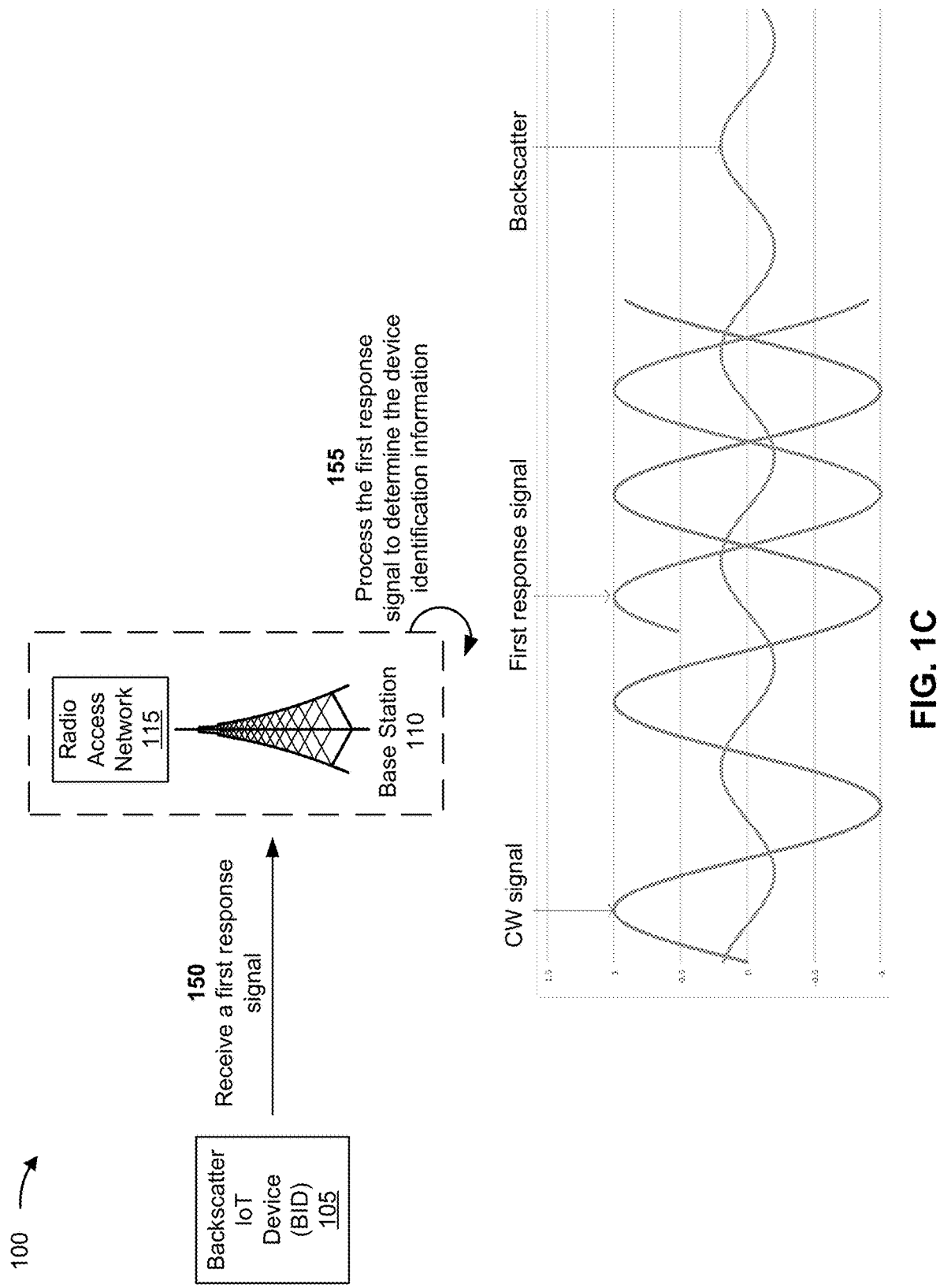

As shown in FIG. 1C, and by reference number 150, base station 110 may receive a first response signal. For example, after providing the first CW signal, base station 110 may monitor (using the bandwidth part) a response from one or more BIDs. The first response signal may be a signal reflected from the first CW signal. For example, the first response signal may be a backscatter signal reflected from the CW. The first CW signal may be reflected by the antenna of BID 105.

In some implementations, prior to reflecting the first CW signal, BID 105 may be configured to modulate the first CW signal (e.g., to encode the first CW signal with information). In some implementations, BID 105 may determine that the first CW signal is a first CW signal received by BID 105 (e.g., since activation of BID 105). Accordingly, BID 105 may determine to modulate the first CW signal using the device identification information of BID 105. The device identification information may include information identifying a manufacturer of BID 105, information identifying a model of BID 105, a serial number of BID 105, information similar to an International Mobile Equipment Identity that identifies BID 105, among other examples of information that may uniquely identify BID 105.

In some implementations, when modulating the first CW signal, BID 105 may be configured to create a mismatch between an impedance of an electrical load of BID 105 and an impedance of the antenna of BID 105. The mismatch may cause a shift (or change) of an amplitude of the first CW signal and/or of a phase of the first CW signal. The mismatch may be created based on the device identification information (e.g., based on bits of data included in the device identification information).

In this regard, the shift of the amplitude of the first CW signal and/or of the phase of the first CW signal may indicate the device identification information. As an example, a first shift of the amplitude may indicate a value of 00, a second shift of the amplitude may indicate a value of 01, a first shift of the phase may indicate a value of 10, a second shift of the phase may indicate a value of 11, and so on. Accordingly, the first response signal may be modulated with the device identification information.

As shown in FIG. 1C, and by reference number 155, base station 110 may process the first response signal to determine the device identification information. For example, base station 110 may demodulate the first response signal to determine the device identification information. In some instances, base station 110 may demodulate the first response signal using the modulation encoding scheme. In some implementations, base station 110 may compare the first CW signal (provided to BID 105) and the first response signal to determine a difference between the first CW signal and the first response signal (e.g., a difference signal between the first CW signal and the first response signal). As shown in FIG. 1C, the difference signal may be a backscatter signal.

In some examples, base station 110 may determine a change in amplitude between the first CW signal and the first response signal and/or determine a change in phase between the CW wave signal and the first response signal. Base station 110 may determine the device identification information based on the change in amplitude and/or the change in phase. In some examples, base station 110 may use the modulation encoding scheme to determine values associated with the change in amplitude and/or the change in phase, and thereby determine the device identification information.

Figure 1D:
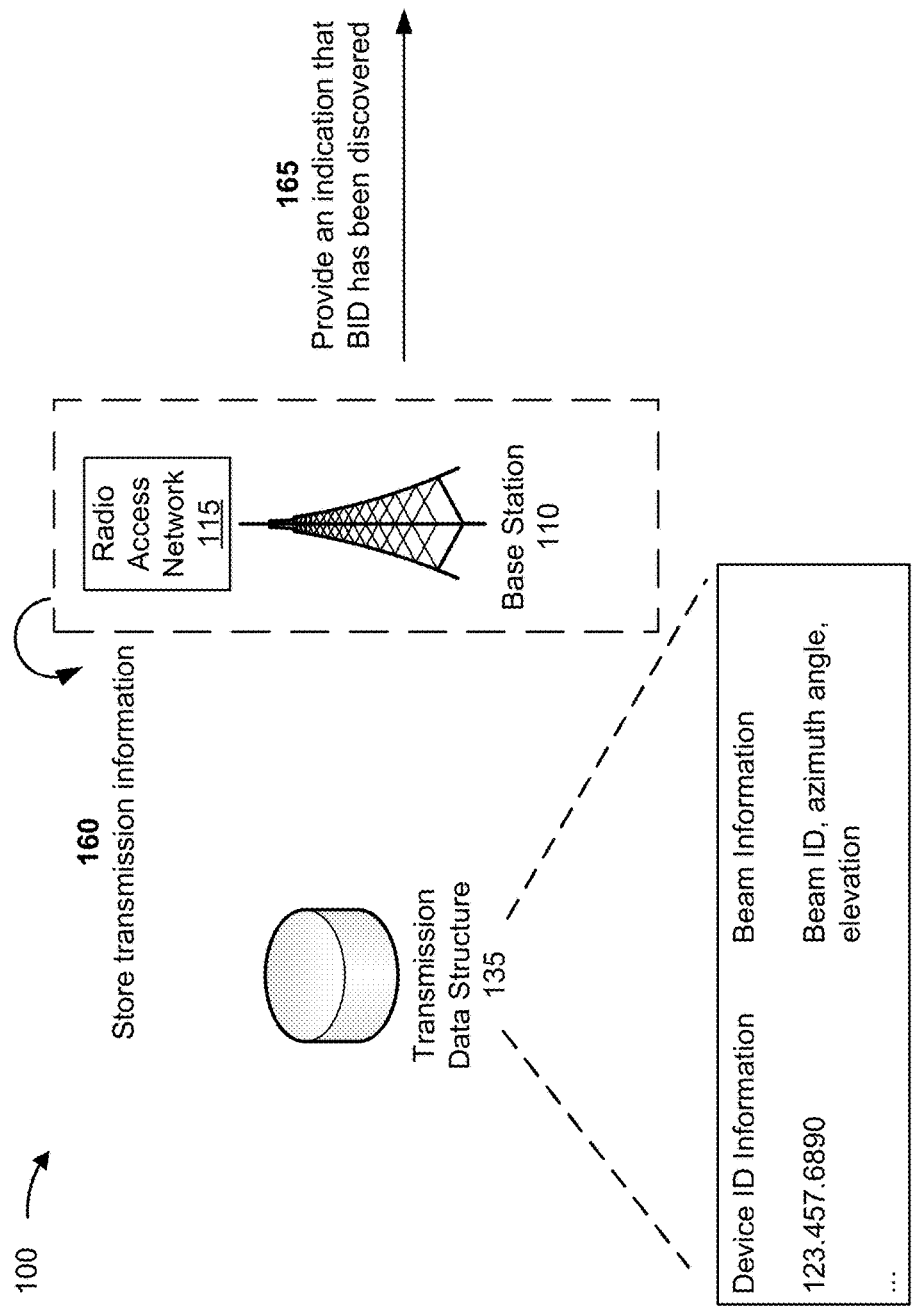

As shown in FIG. 1D, and by reference number 160, base station 110 may store transmission information. For example, base station 110 may determine that the device identification information was obtained from the first response signal and that the first response signal was received based on the first CW signal provided using the beam. Accordingly, base station 110 may determine to store the device identification information in association with the beam information regarding the beam.

In this regard, base station 110 may store the device identification information in association with the beam information as the transmission information. The transmission information may be stored in transmission data structure 135. In some implementations, base station 110 may store the device identification information in association with the beam information to facilitate communication with BID 105. For example, base station 110 may determine to use the beam to provide additional CW signals to BID 105 (e.g., using the bandwidth part) to poll BID 105 for the device data.

The transmission information may identify BID 105 as a device within a coverage area of base station 110. In some implementations, base station 110 may repeat the aforementioned actions (e.g., described in FIGS. 1B to 1D) to generate a mapping of all devices within the coverage area of base station 110.

As shown in FIG. 1D, and by reference number 165, base station 110 may provide an indication that BID 105 has been discovered. In some implementations, after processing the first response signal and/or storing the transmission information, base station 110 may provide the indication that BID 105 has been discovered. For example, base station 110 may provide the indication to BID controller 130. In some implementations, base station 110 may cause bandwidth information identifying the bandwidth part to be provided to BID 105. For example, base station 110 may provide the bandwidth information to BID controller 130 to cause BID controller 130 to provide the bandwidth information to BID 105. In some examples, BID 105 may provide additional response signals using the bandwidth part.

Figure 1E:
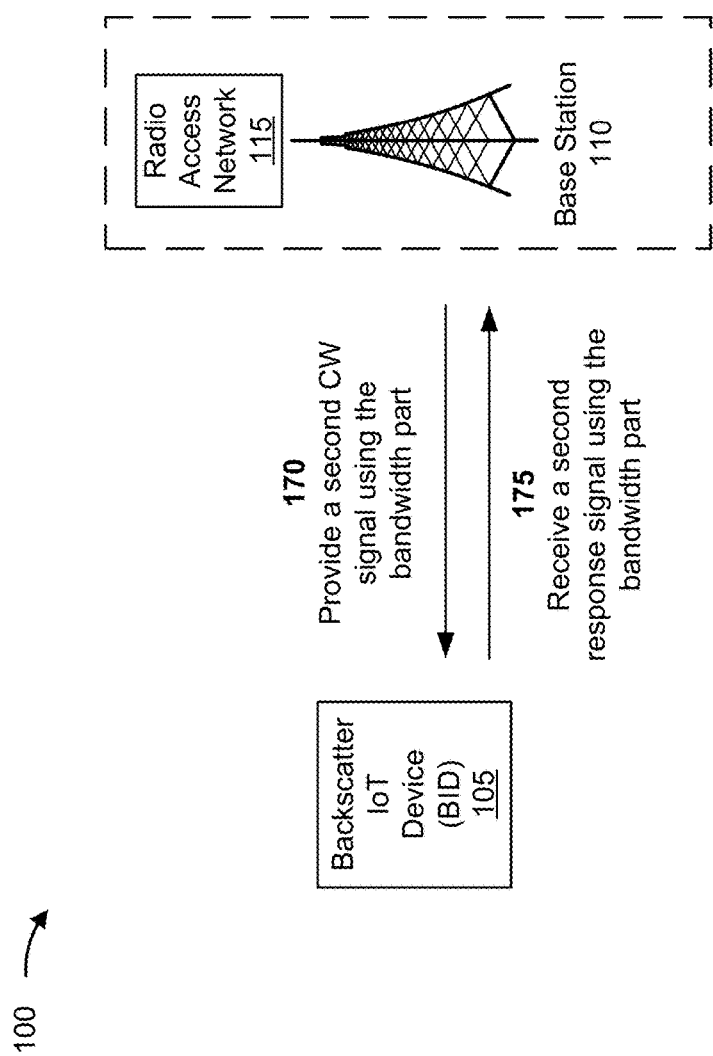

As shown in FIG. 1E, and by reference number 170, base station 110 may provide a second CW signal using the bandwidth part. For example, after storing the transmission information, base station 110 may provide the second CW signal to BID 105 using the bandwidth part, in a manner similar to the manner described above in connection with FIG. 1B.

In some implementations, based on receiving the indication that BID 105 has been discovered, BID controller 130 may cause base station 110 to periodically obtain the device data from BID 105. For example, BID controller 130 may cause base station 110 to obtain the device data every 6 hours, every twelve hours, every day, among examples. In some instances, BID controller 130 may periodically provide a device data request to base station 110 to cause base station 110 to periodically obtain the device data from BID 105. Alternatively, BID controller 130 may provide the device data request, and the device data request may include information identifying a frequency of obtaining the device data.

In some implementations, base station 110 may provide the second CW signal to BID 105 based on the transmission information. For example, base station 110 may obtain the transmission information from transmission data structure 135 and determine, based on the transmission information, that the beam is associated with BID 105. Accordingly, base station 110 may use the beam to provide the second CW signal to BID 105 using the bandwidth part.

As shown in FIG. 1E, and by reference number 175, base station 110 may receive a second response signal using the bandwidth part. For example, after providing the second CW signal to BID 105, base station 110 may monitor a response from BID 105 using the bandwidth part, in a manner similar to the manner described above in connection with FIG. 1C.

In some implementations, BID 105 may receive the second CW signal and determine that the second CW signal is a CW signal received after the first CW signal. Accordingly, BID 105 may modulate the second CW signal with the device data to obtain a second modulated CW signal, in a manner similar to the manner described above in connection with FIG. 1C. In some examples, BID 105 may further modulate the second CW signal with the device identification information in a similar manner. BID 105 may provide the second modulated CW signal as the second response signal, in a manner similar to the manner described above in connection with FIG. 1C. BID 105 may provide the second response signal as a backscatter signal.

In some implementations, BID 105 may determine that the device data is not to be provided (e.g., because BID 105 has not obtained any device data and/or the device data has not changed since a last time BID 105 provided the device data to base station 110). In this regard, BID 105 may modulate the second CW signal with the device identification information (e.g., without the device data).

Figure 1F:
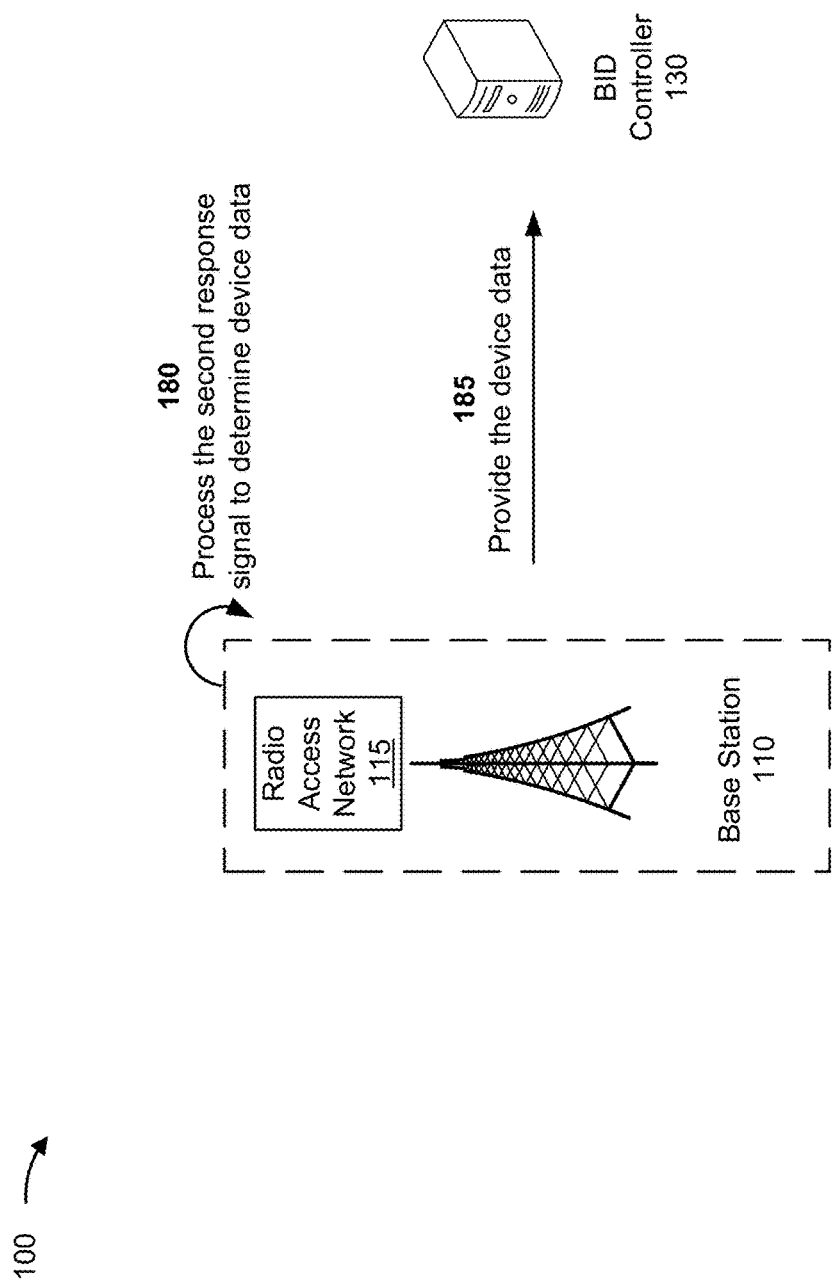

As shown in FIG. 1F, and by reference number 180, base station 110 may process the second response signal to determine the device data. For example, base station 110 may process the second response signal to determine the device data, in a manner similar to the manner described above in connection with FIG. 1C.

As shown in FIG. 1F, and by reference number 185, base station 110 may provide the device data. For example, base station 110 may provide the device data to BID controller 130 to cause BID controller 130 to provide the device data to one or more devices for processing. In some implementations, the one or more devices may be part of a cloud computing environment. The one or more devices may process the device data and take one or more actions regarding the device data.

As an example, the device data may indicate a measure of structural integrity of a building. Accordingly, the one or more devices may transmit a notification to a device of an owner of the building, to a device of governmental agency associated with structural integrity, to a device of a law enforcement agency, to a device of a first responder, among other examples. In some implementations, BID controller 130 may process the device data and/or perform an action in a manner similar to the manner described above in connection with the one or more devices.

By providing the device identification information and/or the device data using the backscatter signal as described herein, BID 105 may no longer require the use of the transmitter. Accordingly, BID 105 may preserve computing resources, networking resources, among other examples that would have otherwise been used by the transmitter to provide the device identification information and/or the device data. In instances where BID 105 is a low-power device, BID 105 may preserve energy resources (e.g., battery resources and/or power grid resources) that would have otherwise been used by the transmitter to provide the device identification information and/or the device data.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
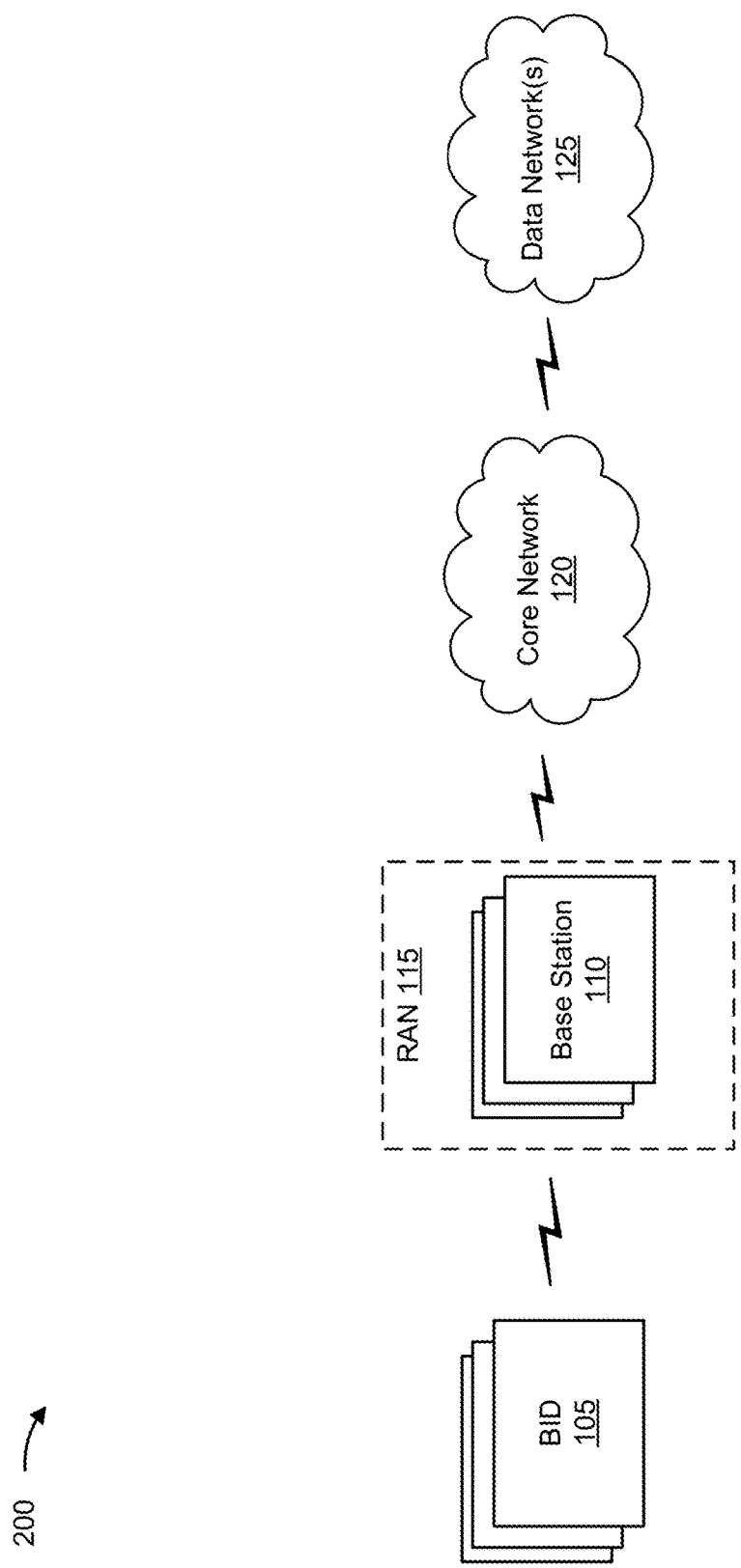
FIG. 2 is a diagram of an example environment in which systems and/or methods described herein may be implemented.

FIG. 2 is a diagram of an example environment 200 in which systems and/or methods, described herein, can be implemented. As shown in FIG. 2, environment 200 can include BID 105, base station 110, RAN 115, core network 120, and data network 125. Devices of environment 200 can interconnect via wired connections, wireless connections, or a combination of wired and wireless connections.

BID 105 includes one or more devices capable of communicating with RAN 115 and/or a data network 125 (e.g., via core network 120). For example, BID 105 can include a sensing device, a metering device, an appliance (e.g., a thermostat), a biometric device, a wearable device, a switch, an actuator, a timer, a signal detection device (e.g., to detect the presence of a signal, such as Bluetooth signal, an infrared signal, or the like), a machine-to-machine (M2M) device, and/or a similar device. BID 105 can be capable of communicating using uplink (e.g., user equipment (UE) to RAN) communications, downlink (e.g., RAN to UE) communications, and/or sidelink (e.g., UE-to-UE) communications. In some implementations, BID 105 can include a machine-type communication (MTC) UE, such as an evolved or enhanced MTC (eMTC) UE. In some implementations, BID 105 can include an IoT UE, such as a narrowband IoT (NB-IoT) UE, among other examples.

RAN 115 includes one or more devices capable of communicating with BID 105 using a cellular radio access technology (RAT). For example, RAN 115 can include a base station 110, a base transceiver station, a radio base station, a node B, an evolved node B (eNB), a gNB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, base station 110 has the same characteristics and functionality of RAN 115, and vice versa. RAN 115 can transfer traffic between BID 105 (e.g., using a cellular RAT), one or more other RANs 115 (e.g., using a wireless interface or a backhaul interface, such as a wired backhaul interface), and/or core network 120. RAN 115 can provide one or more cells that cover geographic areas. Some RANs 115 can be mobile base stations. Some RANs 115 can be capable of communicating using multiple RATs.

In some implementations, RAN 115 can perform scheduling and/or resource management for BIDs 105 covered by RAN 115 (e.g., BIDs 105 covered by a cell provided by RAN 115). In some implementations, RAN 115 can be controlled or coordinated by a network controller, which can perform load balancing, network-level configuration, and/or the like. The network controller can communicate with RAN 115 via a wireless or wireline backhaul. In some implementations, RAN 115 can include a network controller, a self-organizing network (SON) module or component, or a similar module or component. In other words, RAN 115 can perform network control, scheduling, and/or network management functions (e.g., for other RAN 115 and/or for uplink, downlink, and/or sidelink communications of BIDs 105 covered by RAN 115). In some implementations, RAN 115 can apply network slice policies to perform the network control, scheduling, and/or network management functions. In some implementations, RAN 115 can include a central unit and multiple distributed units. The central unit can coordinate access control and communication with regard to the multiple distributed units. The multiple distributed units can provide BIDs 105 and/or other RANs 115 with access to data network 125 via core network 120.

Core network 120 includes various types of core network architectures, such as a 5G Next Generation (NG) Core (e.g., core network 120 of FIG. 3), an LTE Evolved Packet Core (EPC), among other examples. In some implementations, core network 120 can be implemented on physical devices, such as a gateway, a mobility management entity, among other examples. In some implementations, the hardware and/or software implementing core network 120 can be virtualized (e.g., through the use of network function virtualization and/or software-defined networking), thereby allowing for the use of composable infrastructure when implementing core network 120. In this way, networking, storage, and compute resources can be allocated to implement the functions of core network 120 (described with regard to FIG. 4) in a flexible manner as opposed to relying on dedicated hardware and software to implement these functions.

Data network 125 includes one or more wired and/or wireless data networks. For example, data network 125 can include an Internet Protocol (IP) Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, or an operator services network, among other examples, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 3 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
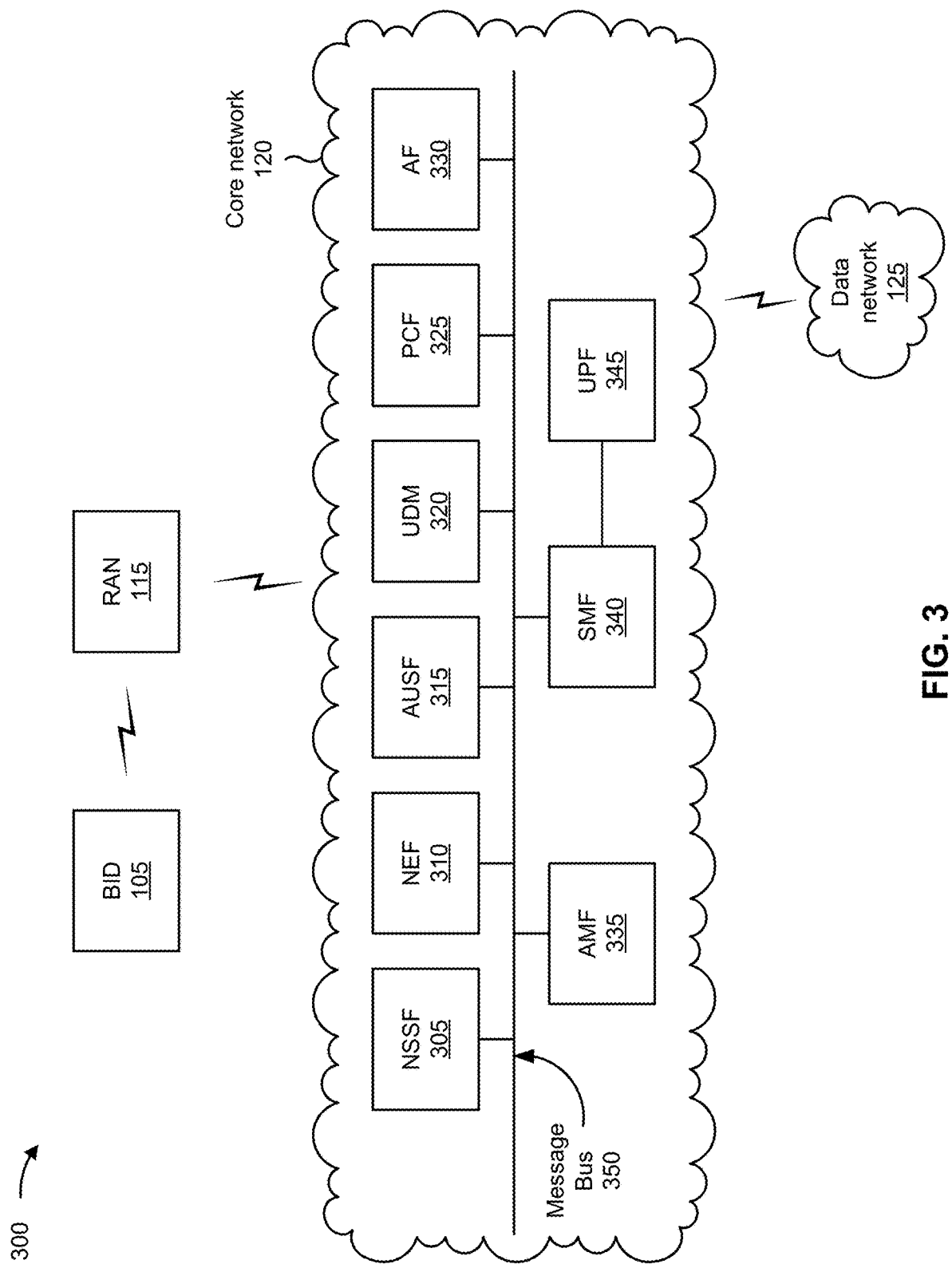
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include BID 105, RAN 115, core network 120, and data network 125. Devices and/or networks of example environment 300 may interconnect via wired connections, wireless connections, or a combination of wired and wireless connections.

BID 105 includes one or more devices capable of receiving, generating, storing, processing, and/or providing information, such as information described herein. BID 105 has been described above in connection with FIG. 1 and FIG. 2.

RAN 115 may support, for example, a cellular RAT. RAN 115 may include one or more base stations (e.g., base transceiver stations, radio base stations, node Bs, eNodeBs (eNBs), gNodeBs (gNBs), base station subsystems, cellular sites, cellular towers, access points, TRPs, radio access nodes, macrocell base stations, microcell base stations, picocell base stations, femtocell base stations, or similar types of devices) and other network entities that can support wireless communication for BID 105. RAN 115 may transfer traffic between BID 105 (e.g., using a cellular RAT), one or more base stations (e.g., using a wireless interface or a backhaul interface, such as a wired backhaul interface), and/or core network 120. RAN 115 may provide one or more cells that cover geographic areas.

In some implementations, RAN 115 may perform scheduling and/or resource management for BID 105 covered by RAN 115 (e.g., BID 105 covered by a cell provided by RAN 115). In some implementations, RAN 115 may be controlled or coordinated by a network controller, which may perform load balancing, network-level configuration, and/or other operations. The network controller may communicate with RAN 115 via a wireless or wireline backhaul. In some implementations, RAN 115 may include a network controller, a SON module or component, or a similar module or component. In other words, RAN 115 may perform network control, scheduling, and/or network management functions (e.g., for uplink, downlink, and/or sidelink communications of BID 105 covered by RAN 115).

In some implementations, core network 120 may include an example functional architecture in which systems and/or methods described herein may be implemented. For example, core network 120 may include an example architecture of a 5G NG core network included in a 5G wireless telecommunications system. While the example architecture of core network 120 shown in FIG. 2 may be an example of a service-based architecture, in some implementations, core network 120 may be implemented as a reference-point architecture and/or a 4G core network, among other examples.

As shown in FIG. 3, core network 120 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345 These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 305 includes one or more devices that select network slice instances for BID 105. By providing network slicing, NSSF 305 allows an operator to deploy multiple substantially independent end-to-end networks potentially with the same infrastructure. In some implementations, each slice may be customized for different services.

NEF 310 includes one or more devices that support exposure of capabilities and/or events in the wireless telecommunications system to help other entities in the wireless telecommunications system discover network services.

AUSF 315 includes one or more devices that act as an authentication server and support the process of authenticating BID 105 in the wireless telecommunications system.

UDM 320 includes one or more devices that store user data and profiles in the wireless telecommunications system. UDM 320 may be used for fixed access and/or mobile access in core network 120.

PCF 325 includes one or more devices that provide a policy framework that incorporates network slicing, roaming, packet processing, and/or mobility management, among other examples.

AF 330 includes one or more devices that support application influence on traffic routing, access to NEF 310, and/or policy control, among other examples.

AMF 335 includes one or more devices that act as a termination point for non-access stratum (NAS) signaling and/or mobility management, among other examples.

SMF 340 includes one or more devices that support the establishment, modification, and release of communication sessions in the wireless telecommunications system. For example, SMF 340 may configure traffic steering policies at UPF 345 and/or may enforce user equipment IP address allocation and policies, among other examples.

UPF 345 includes one or more devices that serve as an anchor point for intraRAT and/or interRAT mobility. UPF 345 may apply rules to packets, such as rules pertaining to packet routing, traffic reporting, and/or handling user plane QoS, among other examples.

Message bus 350 represents a communication structure for communication among the functional elements. In other words, message bus 350 may permit communication between two or more functional elements.

Data network 125 includes one or more wired and/or wireless data networks. For example, data network 125 may include an IMS, a PLMN, a LAN, a WAN, a MAN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
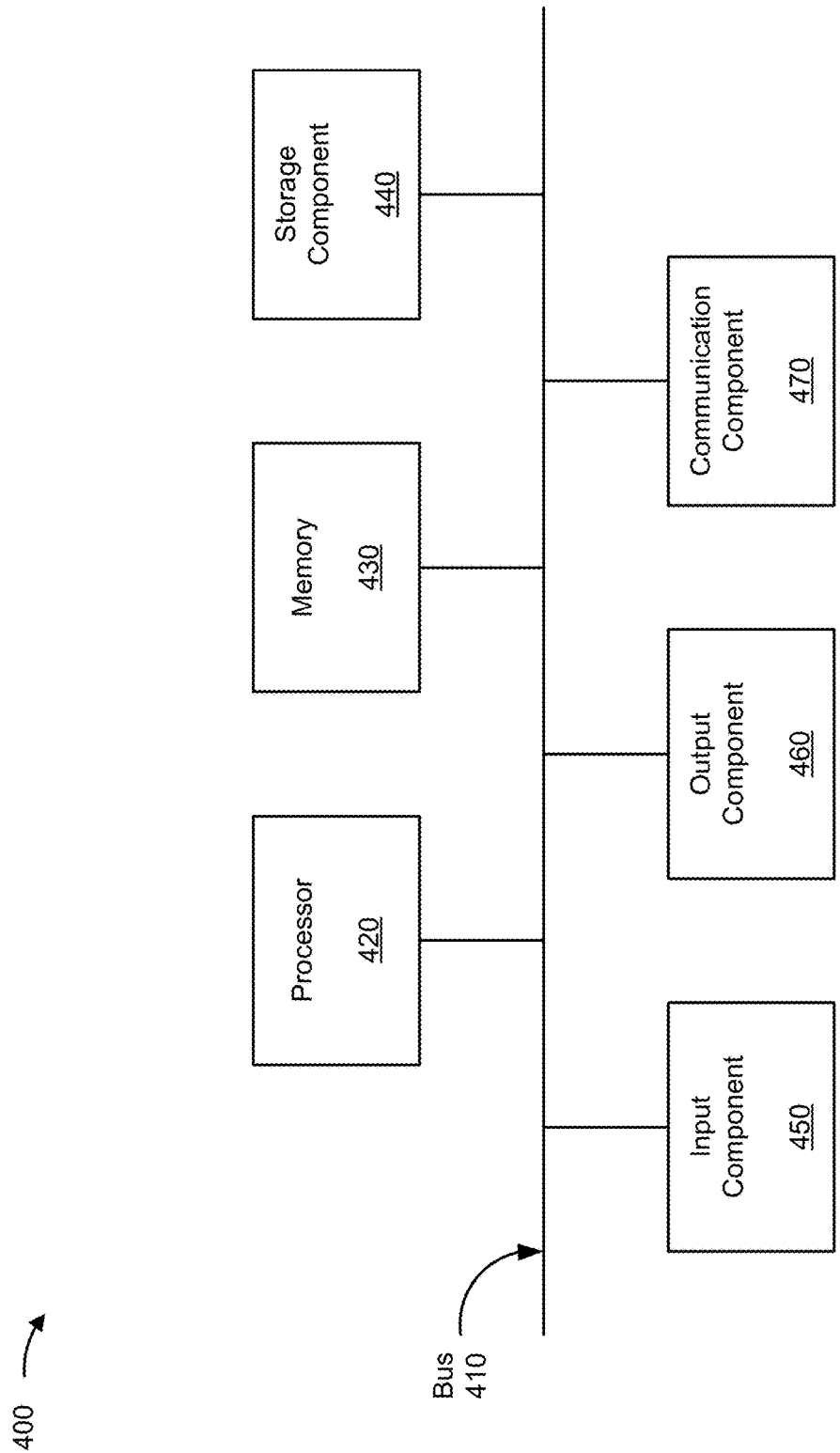
FIG. 4 is a diagram of example components of one or more devices of FIG. 1.

FIG. 4 is a diagram of example components of a device 400, which may correspond to base station 110, BID 105, and/or BID controller 130. In some implementations, base station 110, BID 105, and/or BID controller 130 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
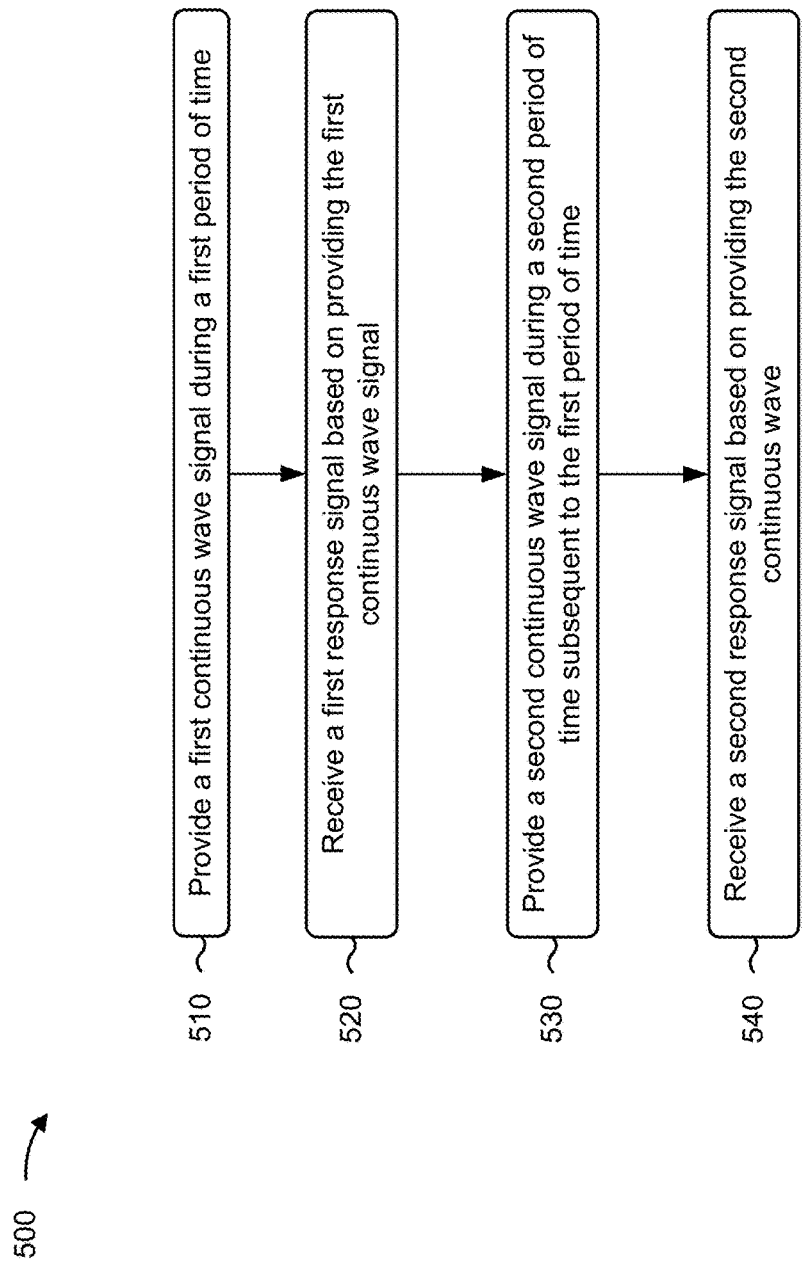
FIG. 5 is a flowchart of an example process relating to obtaining data of a device via a backscatter signal.

FIG. 5 is a flowchart of an example process 500 relating to obtaining data of a device via a backscatter signal. In some implementations, one or more process blocks of FIG. 5 may be performed by a base station (e.g., base station 110). In some implementations, one or more process blocks of FIG. 5 may be performed by another device or a group of devices separate from or including the base station, such as a BID (e.g., BID 105), a BID controller (e.g., BID controller 130), and/or a transmission data structure (e.g., transmission data structure 135). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include providing a first continuous wave signal during a first period of time (block 510). For example, the base station may provide a first continuous wave signal during a first period of time, as described above.

In some examples, providing the first continuous wave signal during the first period of time comprises providing the first continuous wave signal during a period of time associated with a first downlink transmission associated with TDD, and wherein receiving the first response signal comprises receiving the first response signal during the period of time associated with the first downlink transmission.

In some examples, providing the first continuous wave signal comprises providing the first continuous wave signal via a scanning beam of the base station, wherein the method further comprises storing, in a data structure, transmission information that includes the information identifying the second device and beam information regarding the scanning beam, and wherein providing the second continuous wave signal comprises providing, to the first device, the second continuous wave signal via the scanning beam based on the transmission information.

As further shown in FIG. 5, process 500 may include receiving, from a first device, a first response signal based on providing the first continuous wave signal (block 520). For example, the base station may receive, from a first device, a first response signal based on providing the first continuous wave signal, wherein the first response signal includes information identifying the first device, as described above. In some implementations, the first response signal includes information identifying the first device.

In some examples, receiving the first response signal comprises receiving a first backscatter signal reflected from the first continuous wave signal, and wherein receiving the second response signal comprises receiving a second backscatter signal reflected from the second continuous wave signal.

In some examples, the base station may assign, based on receiving the first response signal, a bandwidth part associated with communicating with the second device. The bandwidth part may reduce power consumption.

As further shown in FIG. 5, process 500 may include providing, to the first device, a second continuous wave signal during a second period of time subsequent to the first period of time (block 530). For example, the base station may provide, to the first device, a second continuous wave signal during a second period of time subsequent to the first period of time, wherein the second continuous wave signal is provided based on receiving the first response, as described above. In some implementations, the second continuous wave signal is provided based on receiving the first response.

In some examples, providing the second continuous wave signal during the second period of time comprises providing the second continuous wave during a period of time associated with a second downlink transmission associated with TDD, and wherein receiving the first response signal comprises receiving the first response signal during the period of time associated with the second downlink transmission.

As further shown in FIG. 5, process 500 may include receiving, from the first device, a second response signal based on providing the second continuous wave (block 540). For example, the base station may receive, from the first device, a second response signal based on providing the second continuous wave, wherein the second response signal includes device data obtained by the first device, as described above. In some implementations, the second response signal includes device data obtained by the first device.

In some examples, process 500 may include providing the device data to a second device to cause the second device to perform an action based on the device data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
providing a first continuous wave signal during a first period of time;
receiving, from a first device, a first response signal based on providing the first continuous wave signal;
providing, to the first device, a second continuous wave signal during a second period of time subsequent to the first period of time,
wherein the second continuous wave signal is provided based on receiving the first response; and
receiving, from the first device, a second response signal based on providing the second continuous wave,
wherein the second response signal includes device data obtained by the first device.

2. The method of claim 1, wherein providing the first continuous wave signal during the first period of time comprises:
providing the first continuous wave signal during a period of time associated with a first downlink transmission associated with time division duplexing (TDD); and
wherein receiving the first response signal comprises:
receiving the first response signal during the period of time associated with the first downlink transmission.

3. The method of claim 2, wherein providing the second continuous wave signal during the second period of time comprises:
providing the second continuous wave during a period of time associated with a second downlink transmission associated with time division duplexing (TDD); and
wherein receiving the first response signal comprises:
receiving the first response signal during the period of time associated with the second downlink transmission.

4. The method of claim 1, further comprising:
processing the second response signal to determine the device data,
wherein processing the second response signal includes:
determining a difference between the second continuous wave signal and the second response signal to determine a difference signal, and
determining the device data based on the difference signal.

5. The method of claim 4, wherein determining the device data based on the difference signal comprises:
determining at least one of:
a change in amplitude between the second continuous wave signal and the second response signal, or
a change in phase between the second continuous wave signal and the second response signal; and
determining the device data based on the at least one of the change in amplitude or the change in phase.

6. The method of claim 1, wherein receiving the first response signal comprises:
receiving a first backscatter signal reflected from the first continuous wave signal; and
wherein receiving the second response signal comprises:
receiving a second backscatter signal reflected from the second continuous wave signal.

7. The method of claim 1, wherein providing the first continuous wave signal comprises:
providing the first continuous wave signal via a scanning beam of a base station;
wherein the method further comprises:
storing, in a data structure, transmission information that includes device identification information identifying the first device and beam information regarding the scanning beam; and
wherein providing the second continuous wave signal comprises:
providing, to the first device, the second continuous wave signal via the scanning beam based on the transmission information.

8. A first device, comprising:
one or more processors configured to:
provide a first continuous wave signal, via a scanning beam, during a first period of time;
receive, from a second device, a first response signal reflected from the first continuous wave signal;
provide, to the second device, a second continuous wave signal during a second period of time subsequent to the first period of time;
receive, from the second device, a second response signal reflected from the second continuous wave signal,
wherein the second response signal includes device data obtained by the second device; and
provide the device data to cause an action to be performed based on the device data.

9. The first device of claim 8, wherein, to provide the second continuous wave signal, the one or more processors are configured to:
provide the device data to a third device to cause the third device to perform an action based on the device data,
wherein the first device comprises a base station,
wherein the second device comprises a backscatter Internet-of-Things device (BID),
wherein the first response signal includes device identification information identifying the second device, and
wherein the third device comprises a BID controller device that controls the BID.

10. The first device of claim 8, wherein the one or more processors are further configured to:
assign, based on receiving the first response signal, a bandwidth part associated with communicating with the second device,
wherein the bandwidth part reduces power consumption; and
cause bandwidth information identifying the bandwidth part to be provided to the second device.

11. The first device of claim 10, wherein, to provide the second continuous wave signal, the one or more processors are configured to:
provide the second continuous wave signal, to the second device, using the bandwidth part; and
wherein, to receive the second response signal, the one or more processors are configured to:
monitor the bandwidth part, and
receive the second response signal via the bandwidth part based on monitoring the bandwidth part.

12. The first device of claim 11, wherein, to provide the first continuous wave signal, the one or more processors are configured to:
periodically provide a backscatter continuous wave signal via one or more scanning beams,
wherein the backscatter continuous wave signal includes the first continuous wave signal.

13. The first device of claim 8, wherein the first continuous wave signal is provided via a beam,
wherein the first response signal includes device identification information identifying the second device, wherein the one or more processors are further configured to:
- store, in a data structure, transmission information that includes the device identification information identifying the second device and beam information regarding the beam, and
- wherein, to provide the second continuous wave signal, the one or more processors are configured to:
  - provide, to the second device, the second continuous wave signal via the beam based on the transmission information.

14. The first device of claim 13, wherein the first device includes a base station, and
wherein, to store the transmission information, the one or more processors are configured to:
- store one or more of information regarding an antenna associated with the beam, information regarding an azimuth angle associated with the beam, or information regarding an elevation associated with the beam.

15. A non-transitory computer-readable medium storing a set of instructions, the set of instructions comprising:
one or more instructions that, when executed by one or more processors of a base station, cause the base station to:
- provide a first backscatter continuous wave signal, via a scanning beam, during a first period of time;
- receive, from a device, a first response signal reflected from the first backscatter continuous wave signal;
- assign, based on receiving the first response signal, a bandwidth part associated with communicating with the device;
- provide, to the device and using the bandwidth part, a second backscatter continuous wave signal during a second period of time subsequent to the first period of time; and
- receive, from the device and via the bandwidth part, a second response signal reflected from the second backscatter continuous wave signal,
  - wherein the second response signal includes device data obtained by the device.

16. The non-transitory computer-readable medium of claim 15, wherein the device is a first device,
wherein the one or more instructions, to provide the first backscatter continuous wave signal, further cause the base station to:
- receive, from a second device, a discovery request to provide the first backscatter continuous wave signal to discover the first device; and
- provide the first backscatter continuous wave signal based on the discovery request.

17. The non-transitory computer-readable medium of claim 16, wherein the one or more instructions, to provide the second backscatter continuous wave signal, further cause the base station to:
- receive, from the second device, a data request to provide the second backscatter continuous wave signal to obtain data from the first device; and
- provide the second backscatter continuous wave signal based on the data request.

18. The non-transitory computer-readable medium of claim 15, wherein the one or more instructions, when executed by the one or more processors, further cause the base station to:
- assign a bandwidth part associated with communicating with the device based on receiving the first response signal,
  - wherein communication via the bandwidth part reduces power consumption; and
- cause bandwidth information identifying the bandwidth part to be provided to the device.

19. The non-transitory computer-readable medium of claim 18, wherein the one or more instructions, to provide the second continuous wave signal, cause the base station to:
- provide the second continuous wave signal, to the device, using the bandwidth part; and
- wherein the one or more instructions, to receive the second response signal, cause the base station to:
  - receive the second response signal via the bandwidth part.

20. The non-transitory computer-readable medium of claim 15, wherein the one or more instructions, to provide the first backscatter continuous wave signal, cause the base station to:
- provide the first backscatter continuous wave signal during a period of time associated with a first downlink transmission associated with time division duplexing (TDD); and
- wherein the one or more instructions, to receive the first response signal, cause the base station to:
  - receive the first response signal during the period of time associated with the first downlink transmission.

* * * * *